US00RE37365B1

(19) United States
(12) Reissued Patent
Shrader et al.

(10) Patent Number: US RE37,365 E
(45) Date of Reissued Patent: Sep. 18, 2001

(54) CLASP MECHANISM

(75) Inventors: James P. Shrader, 1284 Ovington Rd., Jacksonville, FL (US) 32216; Guy Beard, 2763 Southwood La., Jacksonville, FL (US) 32207

(73) Assignees: Guy Beard; James P. Shrader, both of Jacksonville, FL (US); OroAmerica, Inc., Burbank, CA (US); a part interest

(21) Appl. No.: 09/444,416

(22) Filed: Nov. 19, 1999

Related U.S. Patent Documents

Reissue of:
(64) Patent No.: 5,117,539
Issued: Jun. 2, 1992
Appl. No.: 07/753,733
Filed: Sep. 3, 1991

(51) Int. Cl.[7] ..... A44B 13/02; A44B 21/00; A44C 1/00

(52) U.S. Cl. ..... D24/599.8; 24/598.5; 24/599.1; 63/12; 294/82.2

(58) Field of Search ..... 24/599.8, 598.7, 24/599.1, 599.2, 599.4, 599.7, 600.3, 601.9, 601.2, 543; 63/12; 294/82.2

(56) References Cited

U.S. PATENT DOCUMENTS

| | | | | |
|---|---|---|---|---|
| 628,619 | * | 7/1899 | Alwood | 24/599.1 |
| 731,162 | * | 6/1903 | Carter | 24/599.8 |
| 844,980 | * | 2/1907 | Welcome, Sr. | 24/599.1 |
| 1,521,811 | | 1/1925 | Hartbauer . | |
| 1,790,056 | * | 1/1931 | Moody | 294/82.2 |
| 2,874,435 | * | 2/1959 | Nielsen | 24/599.1 |
| 3,956,804 | * | 5/1976 | Gatof et al. | 24/598.5 |
| 3,982,307 | * | 9/1976 | Smith et al. | 24/543 |

FOREIGN PATENT DOCUMENTS

| | | | | |
|---|---|---|---|---|
| 0430892 | * | 10/1911 | (FR) | 24/599.7 |
| 0462790 | * | 12/1913 | (FR) | 24/599.7 |
| 0231197 | * | of 1911 | (GB) | 294/82.2 |
| 2106584 | * | 4/1983 | (GB) | 24/599.8 |

OTHER PUBLICATIONS

General Catalog of Spain's Jewelry—Jewelry Duplex Jan. 1987.
Jewelry Duplex—Jan. 1985 No. 9.

* cited by examiner

*Primary Examiner*—Victor N. Sakran
(74) *Attorney, Agent, or Firm*—Oblon, Spivak, McClelland, Maier & Neustadt, P.C.

(57) ABSTRACT

A clasp mechanism having a main body, a keeper arm and a spring, where the keeper arm extends through the main body in an arm cavity. The keeper arm is pivotally attached to said main body to operate in a scissor-like manner. The keeper arm has a mating end which abuts a hook end on the main body to form a closed interior space and an actuating shoulder extending from the main body. The spring maintains the mating end in the closed position abutting the hook end until the actuating shoulder is pressed into the main body by the user.

60 Claims, 1 Drawing Sheet

CLASP MECHANISM

Matter enclosed in heavy brackets [ ] appears in the original patent but forms no part of this reissue specification; matter printed in italics indicates the additions made by reissue.

BACKGROUND OF THE INVENTION

This invention relates generally to the field of clasp mechanisms used to join or close upon themselves chains, ropes or other articles. More particularly, the invention is directed to the field of such clasps used with jewelry chains, bracelets, necklaces, etc.

Clasps used in the jewelry field to join the ends of bracelets and necklaces are of necessity very small so that the clasp mechanism will not detract from the ornamentation of the piece. Such clasps must also be very secure since the jewelry can be very valuable. It is therefore desirable to have clasps which are designed and constructed to be effective against accidental opening, as well as to be easily workable by the user. It is also preferable that the clasp have some artistic merit to it as well. The mechanisms should also be of relatively simple construction.

Typical jewelry clasps operate with spring rings which require the user to slidingly move a curved pin contained within a tubular body to open and close the device. Because the clasp is of such small size, it is very difficult to operate this type of clasp. The user must balance and secure the main body portion while using a fingernail to slide back the mechanism. Other clasps, such as shown in U.S. Pat. No. 2,874,435 to Nielsen and U.S. Pat. No. 3,956,804 to Gatof et al., are constructed with closing pincers which must also be pried or pulled open. These clasps suffer from the same drawbacks.

It is an object of this invention to provide a clasp of small size which is relatively simple mechanically, secure and easily operable.

It is an additional object of the invention to provide a clasp which is operable by a simple squeezing motion between thumb and forefinger, eliminating the need to pull or pry on any particular parts of the device.

BRIEF SUMMARY OF THE INVENTION

The clasp comprises a main body portion, a keeper arm, and a spring member, where the keeper arm is pivotally attached to the main body portion at relatively central points longitudinally of each component so that the two components are moveable relative to each other in a scissor-like manner. The keeper arm is comprised of a mating end, an actuating shoulder, a spring cavity and pivot pin receiving means. The main body is comprised of a hook end, an arm cavity, an arm aperture, and a shoulder aperture. A linkage attachment means, comprising an aperture, loop or the like, is positioned at the end of the main body opposite from the hook end for permanent attachment of the object being joined.

The keeper arm is positioned within the arm cavity of the main body such that the mating end of the keeper arm extends through the arm aperture and meets or corresponds to the hook end. The actuating shoulder of the keeper arm extends from the shoulder aperture of the main body. A pivot pin or like means links the two elements, the pivot pin extending through arm cavity of the main body into the pivot pin receiving means of the keeper arm. The coiled spring in the spring cavity surrounds the pivot pin and the ends of the coiled spring abut portions of the spring cavity and arm cavity so as to maintain the device in the closed position until pressure is applied.

To operate the device, the user grasps the clasp so that the thumb and forefinger rest against the main body and the actuating shoulder part of the keeper arm. Squeezing the main body and the actuating shoulder causes compression of the spring and the actuating shoulder moves into the shoulder cavity of the main body. Because of the centralized pivot, this action causes the mating end of the keeper arm to move inwardly away from the hood end, creating an opening and allowing the hook end to be inserted onto a loop end of a chain, bracelet or necklace. Release of the pressure against the actuating shoulder allows the coiled spring to return the mating end of the keeper arm back into conjunction with the hook arm, closing off the opening and enclosing the loop end securely within the interior portion of the hook end. The pressure of the coiled spring maintains the clasp in this closed position until the device is opened by the user for removal of the loop end.

DETAILED DESCRIPTION OF THE INVENTION

With reference now to the figures, the invention will be described in view of the best mode and preferred embodiment. In general, the invention comprises a main body 10, a keeper arm 20, and a coiled spring 30.

Figure 1:
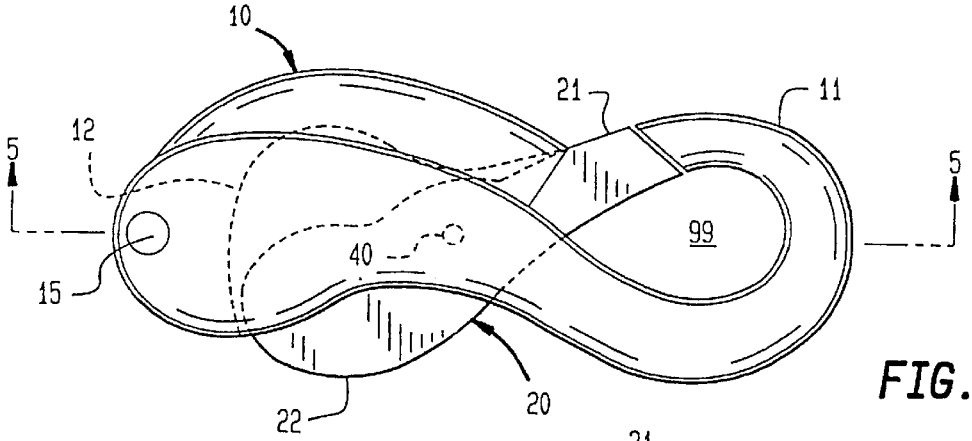
FIG. 1 a side view of the invention in the closed position.
Figure 2:
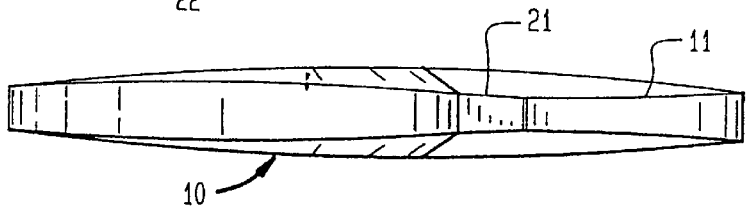
FIG. 2 is a top view of the invention.

Referring to FIG. 1, the relationship of the main body 10 and the keeper arm 20 is shown. The main body 10 comprises a hook end 11 and linkage attachment means 15 positioned at opposite ends of the main body 10. Linkage attachment means 15 is used for connecting the clasp to one end of the chain or article which requires joining, and can be an aperture (as shown) for receiving a chain link, a loop extending from the main body 10, or any other typical structure known in the art for accomplishing this attachment. This attachment will usually be a permanent attachment. Extending through the main body 10 is the keeper arm 20. Keeper arm 20 comprises a mating end 21 and an actuating shoulder 22. Mating end 21 acts in conjunction with hook end 11 of the main body 10 to form a closed interior space 99. Mating end 21 should preferably match the configuration of the hook end 11 at the conjunction point and should abut hook end 11 such that no or only minimal space separates the two components.

Figure 3:
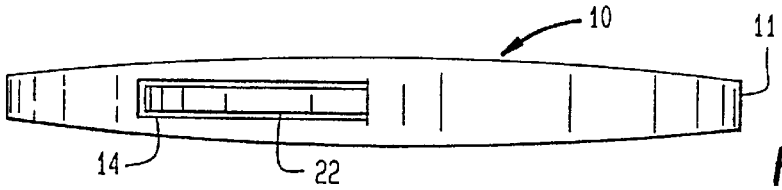
FIG. 3 is a bottom view of the invention.

As seen in FIG. 3, the actuating shoulder 22 of keeper arm 20 extends out of main body 10 through a shoulder aperture 14. Shoulder aperture 14 is a slot which opens into the arm cavity 12 of main body 10.

Figure 5:
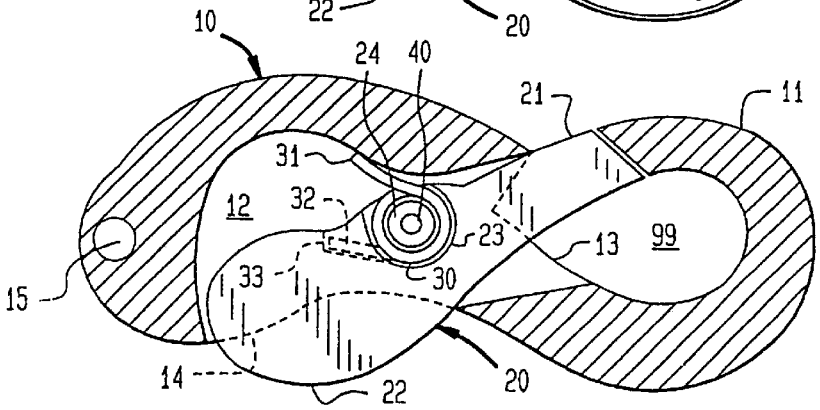
FIG. 5 is a cross-sectional view of the main body portion of the invention taken along line V—V of FIG. 1, showing the keeper arm and spring as exposed.

Referring now to FIG. 5, the main body 10 is shown in cross-section to expose the other components of the invention. Keeper arm 20 is positioned within arm cavity 12 of main body 10. Arm cavity 12 is an interior space of sufficient size to allow the keeper arm 20 a range of motion when pivoted around pivot pin 40. The mating end 21 extends through arm aperture 13 of main body 10 and the actuating shoulder 22 of keeper arm 20 extends out from shoulder aperture 14 of main body 10. Pivot pin 40 extends transversely through arm cavity 12. Pivot pin 40 can be attached to the interior wall of main body 10 or can be inserted through apertures cut into the sides of main body 10, the pivot pin 40 being soldered to secure it to the main body 10. Pivot pin receiving means 24 of keeper arm 20, preferably a tubular aperture, allows keeper arm 20 to rotate on pivot pin 40 relative to main body 10. Pivot pin receiving means 24 is preferably positioned to one side of the longitudinal axis as shown. This positioning allows for a greater separation distance between the mating end 21 and the hook end 11 when the clasp is opened. The size of the arm aperture 13 and overall configuration of the arm cavity 12 controls the extent of movement for keeper arm 20.

Figure 4:
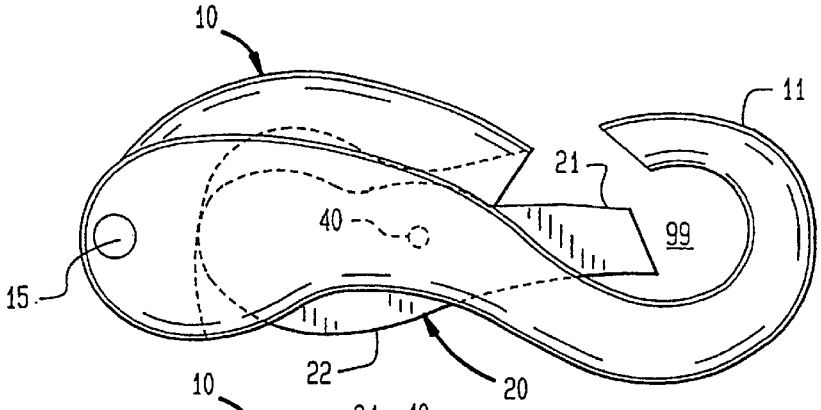
FIG. 4 is a side view of the invention in the open position.

Coiled spring 30 is seated in a spring cavity 23 on keeper arm 20 and surrounds the pivot pin 40 and pivot pin receiving means 24. Coiled spring 30 has an extended long arm 31 and an extended short arm 32. Short arm 32 rests in a slot 33 or abuts the side of keeper arm 20 while long arm 31 abuts against the side of arm cavity 12 in the main body 10. In this manner, the compression within the coiled spring 30 will maintain the keeper arm 20 in the closed position with the mating end 21 abutting the hook end 11 of the main body 10 and the actuating shoulder 22 extending the maximum distance from the shoulder aperture 14. Movement of the actuating shoulder 22 into the arm cavity 12 of the main body 10 will compress the spring 30, causing the mating end 21 to move into the interior space 99 of hook end 11, as shown in FIG. 4. Release of pressure against the spring 30 causes the mating end 21 to realign with the hook end 11, effectively closing off the interior space 99 and preventing any chain loop inserted over hook end 11 from coming free.

While the invention is shown with a particular design for its outer configuration, it should be apparent that other designs are possible which allow the mechanism to operate in the manner as described. The rounded configuration is preferred for ease of manipulation, but is not required. The actuating shoulder 22 and portions of the main body 10 could be scored to create a better gripping surface. Springs of different configuration and positioning can be used in place of coiled spring 30 to maintain the clasp in the closed position. For example, a folded leaf spring could be inserted into the arm cavity 12 to abut the inside of the actuating shoulder 22 of keeper arm 20 and the inside wall of arm cavity 12.

The full scope and definition of the invention therefore, is to be as set forth in the following claims.

We claim:

1. A clasp comprising a main body, a keeper arm and a spring, said main body having a hook end, an arm aperture, a shoulder aperture, and an arm cavity to receive said keeper arm and said spring, said keeper arm having an actuating shoulder and a mating end, said keeper arm being positioned within said arm cavity of said main body whereby said actuating shoulder extends from said arm cavity through said shoulder aperture, said actuating shoulder extending beyond said main body, and said mating end extends from said arm cavity through said arm aperture, said mating end abutting said hook end to create a closed interior space, said keeper arm being pivotally connected to said main body, said spring maintaining said mating end abutting said hook end, said arm cavity being of sufficient size whereby said actuating shoulder can be pivoted into said arm cavity to compress said spring and move said mating end into said interior space *wherein said spring comprises a coiled spring and said keeper arm further comprises a spring cavity in the keeper arm for receiving said spring; and*

*a mechanism for securing the spring in the spring cavity.*

[2. The device of claim 1, wherein said spring is a coiled spring and said keeper arm further comprises a spring cavity adapted to receive said spring.]

3. The [device] *clasp* of claim 1, where said keeper arm is pivotally connected to said main body by a pivot [pin] *member.*

*4. The clasp of claim 3, wherein said arm cavity exclusively houses a portion of the keeper arm and houses the spring and the pivot member.*

*5. The clasp as claimed in claim 4, wherein the keeper arm is pivotally connected at the main body at a position substantially equidistant opposite ends of the keeper arm.*

*6. The clasp of claim 3, wherein the keeper arm cavity has a pivot positioned therein and wherein said pivot member is located substantially equidistant opposite ends of the keeper arm.*

*7. The clasp as claimed in claim 3, wherein the arm cavity exclusively houses the pivot member and the spring.*

*8. The clasp as claimed in claim 3, which comprises a pin receiving member which is mounted on said keeper arm and which is concentric with the pin member and which has said spring positioned so as to surround said pin receiving member.*

*9. The clasp as claimed in claim 3, wherein the pivot member is positioned so as to be concentric with respect to the spring.*

*10. A clasp as claimed in claim 1, wherein the keeper arm is pivotally connected to the main body at a position substantially equidistant opposite ends of said keeper arm.*

*11. The clasp of claim 1, wherein the spring has first and second arms located at opposite ends thereof, respectively, and said arms of the spring extend in a direction substantially opposite said mating end of the keeper arm.*

*12. The clasp as claimed in claim 11, wherein the keeper arm is pivotally connected to the main body at a position substantially equidistant opposite ends of the keeper arm.*

*13. The clasp as claimed in claim 1, wherein said spring comprises a coiled spring seated in said keeper arm, said spring having a first arm contacting the main body and a second arm engaging the keeper arm.*

*14. The clasp as claimed in claim 1, wherein the spring is a first arm located at one end thereof, a second arm which is longer than said first arm at an opposite end of the spring.*

*15. The clasp as claimed in claim 1, wherein said main body comprises a one piece body.*

*16. The clasp as claimed in claim 1, wherein said arm cavity is of sufficient size such that when a user holds the clasp so that either a thumb or an opposing finger of the user rests against the main body and either the opposing finger or the thumb of the user rests against the actuating shoulder and a squeezing action is exerted between the thumb and the opposing finger, said actuating shoulder is pivotable into said arm cavity to compress said spring and move said mating end into said interior space.*

*17. A clasp as claimed in claim 16, wherein the actuating shoulder protrudes beyond a line which is tangent to side portions of the main body member adjacent the actuating shoulder and wherein the squeezing action of the user is exerted on the actuating shoulder at a position where said shoulder portion extends beyond the tangent line.*

*18. The clasp as claimed in claim 1, wherein said actuating shoulder is located substantially opposite said mating end of said keeper arm.*

*19. The clasp as claimed in claim 1, wherein the entire portion of the actuating shoulder extending from said arm cavity is continuously convexly shaped.*

*20. A clasp as claimed in claim 1, wherein the actuating shoulder protrudes beyond a line which is tangent to side portions of the main body member.*

*21. A clasp as claimed in claim 1, wherein said spring comprises a leaf spring.*

*22. The clasp as claimed in claim 1, wherein said arm cavity is of sufficient size such that, when a user holds the clasp so that either a thumb or an opposing finger of the user rests against said main body and either the opposing finger or the thumb of the user rests against said actuating shoulder and a squeezing action is exerted between the thumb and the opposing finger, said actuating shoulder is pivotable into said arm cavity to compress said spring and move said mating end into said interior space.*

*23. A clasp comprising a main body, a keeper arm and a spring, said main body having a hook end, an arm aperture, a shoulder aperture, and an arm cavity to receive said keeper arm and said spring, said keeper arm having an actuating shoulder and a mating end, said keeper arm being positioned within said arm cavity of said main body whereby said actuating shoulder extends from said arm cavity through said shoulder aperture, said actuating shoulder extending beyond said main body, and said mating end extending from said arm cavity through said arm aperture, said mating end abutting said hook end to create a closed interior space, said keeper arm being pivotally connected to said main body, said spring maintaining said mating cold end abutting said hook end, said arm cavity being of sufficient size such that, when a user holds the clasp so that either a thumb or an opposing finger of the user rests against said main body and either the opposing finger or the thumb of the user rests against said actuating shoulder and a squeezing action is exerted between the thumb and the opposing finger, said actuating shoulder is pivotable into said arm cavity to compress said spring and move said mating end into said interior space wherein said arm aperture and said arm cavity extend substantially longitudinally through said main body to control the extent of movement of said keeper arm.*

*24. The device of claim 23, wherein said spring is a coiled spring and said keeper arm further comprises a spring cavity adapted to receive said spring.*

*25. The device of claim 23 wherein said keeper arm is pivotally connected to said main body by a pivot pin.*

*26. The clasp of claim 23, wherein a pivotal connection of said keeper arm to said main body is offset from the longitudinal axis of said main body.*

*27. The clasp of claim 23 wherein said spring is a folded leaf spring.*

*28. The clasp of claim 23 wherein said main body and said actuating shoulder have rounded surfaces upon which the thumb and the opposing finger rest.*

*29. The clasp of claim 23 wherein said main body and said actuating shoulder have scored surfaces for increased frictional contact by the thumb and the opposing finger of the user.*

*30. The clasp of claim 23, wherein the keeper arm is pivotally connected to the main body at a position substantially equidistant opposite ends of said keeper arm.*

*31. The clasp as claimed in claim 23, wherein said actuating shoulder is located substantially opposing said mating end of said keeper arm.*

*32. A clasp as claimed in claim 23, wherein the entire portion of the actuating shoulder extending from the arm cavity is continuously convexly shaped.*

*33. A clasp as claimed in claim 23, wherein the actuating shoulder protrudes beyond a line which is tangent to side portions of the main body member.*

*34. A clasp comprising a main body, a keeper arm and a spring, said main body having a hook end, an arm aperture, a shoulder aperture, and an arm cavity to receive said keeper arm and said spring, said keeper arm having an actuating shoulder and a mating end, said keeper arm being positioned within said arm cavity of said main body such that said actuating shoulder extends from said arm cavity through said shoulder aperture, said actuating shoulder extending beyond said main body, and said mating end extending from said arm cavity through said arm aperture, said mating end abutting said hook end to create a closed interior space, said keeper arm being pivotally connected to said main body, said spring maintaining said mating end abutting said hook end, and said spring is located in a spring cavity in said keeper arm, said arm cavity being of sufficient size such that said actuating shoulder is pivotable into said arm cavity to rotationally compress said spring and move said mating end into said interior space wherein the arm cavity includes a slot and a first end of the spring is mounted in said slot; and*

*a mechanism for securing the spring in the spring cavity wherein a second end of the spring abuts an inner wall of said arm cavity within the main body.*

*35. The clasp of claim 34, further comprising a spring cavity located in the keeper arm and a pivot member pivotably connecting said keeper arm to said body, said spring cavity being adjacent said pivot pin for holding a body portion of said spring.*

*36. The clasp of claim 35, which comprises a pivot receiving member wherein said spring is spaced from said pivot member by said pivot receiving member surrounding said pivot member.*

*37. The clasp of claim 36, wherein said spring comprises a coiled spring and wherein coils of said spring surrounded said pivot receiving member.*

*38. The clasp of claim 34, wherein a first end of said spring extends along a portion of said keeper arm.*

*39. The clasp of claim 38, wherein said main body comprises a one-piece main body.*

*40. The clasp of claim 38, wherein said clasp is operable in a scissor-like manner by grasping said main body and said actuating shoulder between a thumb and an opposing finger of a user and squeezing said main body and said actuating shoulder together.*

*41. The clasp of claim 40, wherein said main body comprises a one-piece main body.*

*42. The clasp of claim 38, further comprising a pivot pin rotatably coupling said main body to said keeper arm and pivot receiving member surrounding said pivot member, wherein said spring is separated from said pivot member by said pivot receiving member.*

*43. The clasp of claim 42, wherein said spring comprises a coiled spring and wherein coils of said spring surround said pivot receiving member.*

*44. The clasp of claim 38, wherein a second end of said spring extends along a portion of said arm cavity.*

*45. The clasp of claim 44, wherein said second end of said spring is longer than said first end of said spring.*

*46. The clasp of claim 45, wherein said main body comprises a one-piece main body.*

*47. The clasp of claim 45, wherein said clasp is operable in a scissor-like manner by grasping said main body and said actuating shoulder between a thumb and opposing finger of a user and squeezing said main body and said actuating shoulder together.*

*48. The clasp of claim 47, wherein said main body comprises a one-piece main body.*

*49. The clasp of claim 38, further comprising a slot within said keeper arm wherein said first end of said spring extends along a wall of said slot.*

*50. The clasp of claim 49, further comprising a spring cavity within said keeper arm, said spring cavity opening into said arm cavity so that said first end of said spring extends into said arm cavity.*

*51. The clasp of claim 50, wherein said spring is spaced from said pivot member by pivot receiving member surrounding said pivot member.*

*52. The clasp of claim 51, wherein said main body comprises a one-piece main body.*

*53. The clasp of claim 51, wherein said clasp is operable in a scissor-like manner by grasping said main body and said actuating shoulder between a thumb and an opposing finger of a user and squeezing said main body and said actuating shoulder together.*

*54. The clasp of claim 53, wherein said main body comprises a one-piece main body.*

*55. The clasp of claim 50, wherein said spring comprises a coiled spring and wherein coils of said spring surround said pivot receiving member.*

*56. A clasp as claimed in claim 34 wherein said main body comprises a unitary main body.*

*57. A clasp as claimed in claim 34 wherein said main body and said keeper arm are movable in a scissor-like manner upon grasping said main body and said actuating shoulder between a thumb and an opposing finger of a user and squeezing said main body and said actuating shoulder.*

*58. The clasp of claim 34, wherein said spring comprises a coiled spring and said keeper arm further comprises a spring cavity adapted to receive said spring.*

*59. The clasp of claim 34, wherein said keeper arm is pivotally connected to said main body by a pivot pin.*

*60. A clasp as claimed in claim 34, wherein said actuating shoulder protrudes beyond a line which is tangent to side portions of the main body member.*

*61. The clasp as claimed in claim 34, wherein said arm cavity is of sufficient size such that, when a user holds the clasp so that either a thumb or an opposing finger of the user rests against said main body and either the opposing finger or the thumb of the user rests against said actuating shoulder and a squeezing action is exerted between the thumb and the opposing finger, said actuating shoulder is pivotable into said arm cavity to compress said spring and move said mating end into said interior space.*

* * * * *